June 26, 1962  A. PELABON  3,040,907
HYDRAULIC SHOCK-ABSORBER
Filed July 16, 1958  3 Sheets-Sheet 1
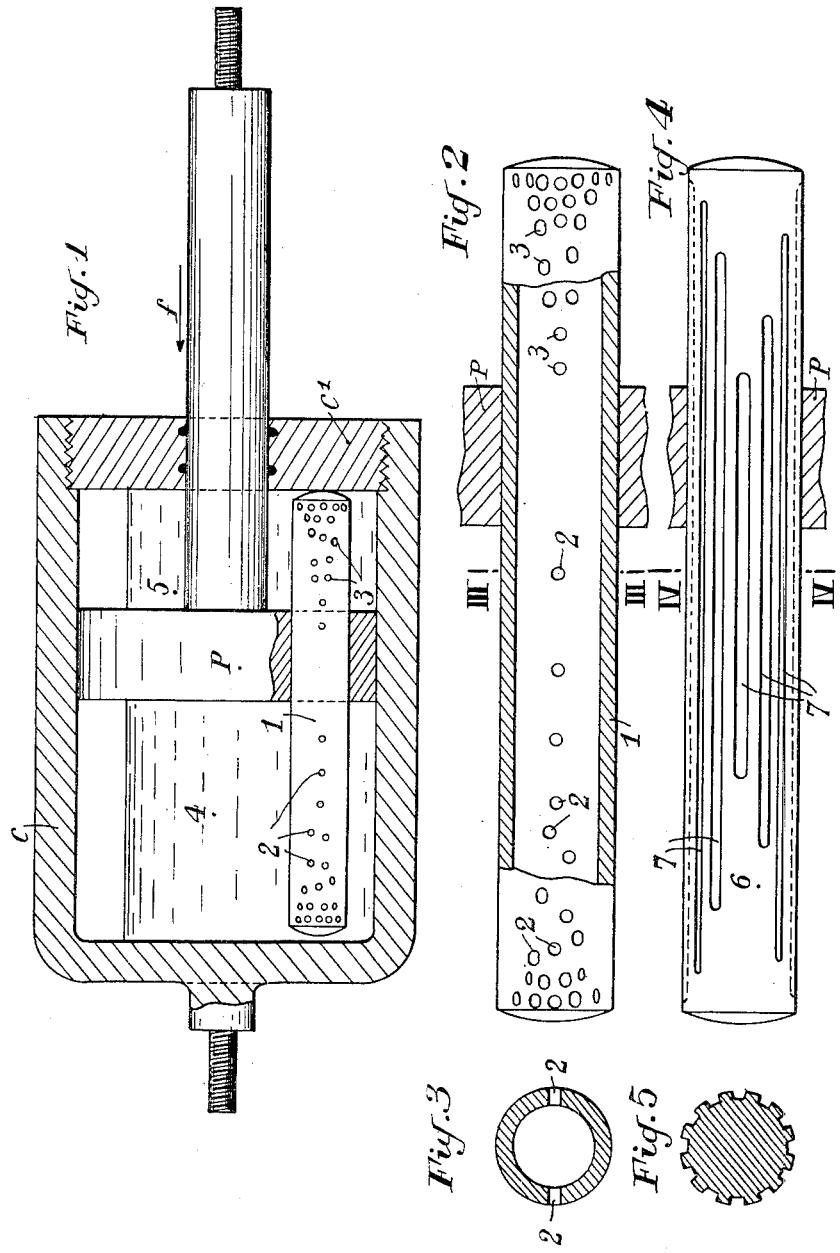

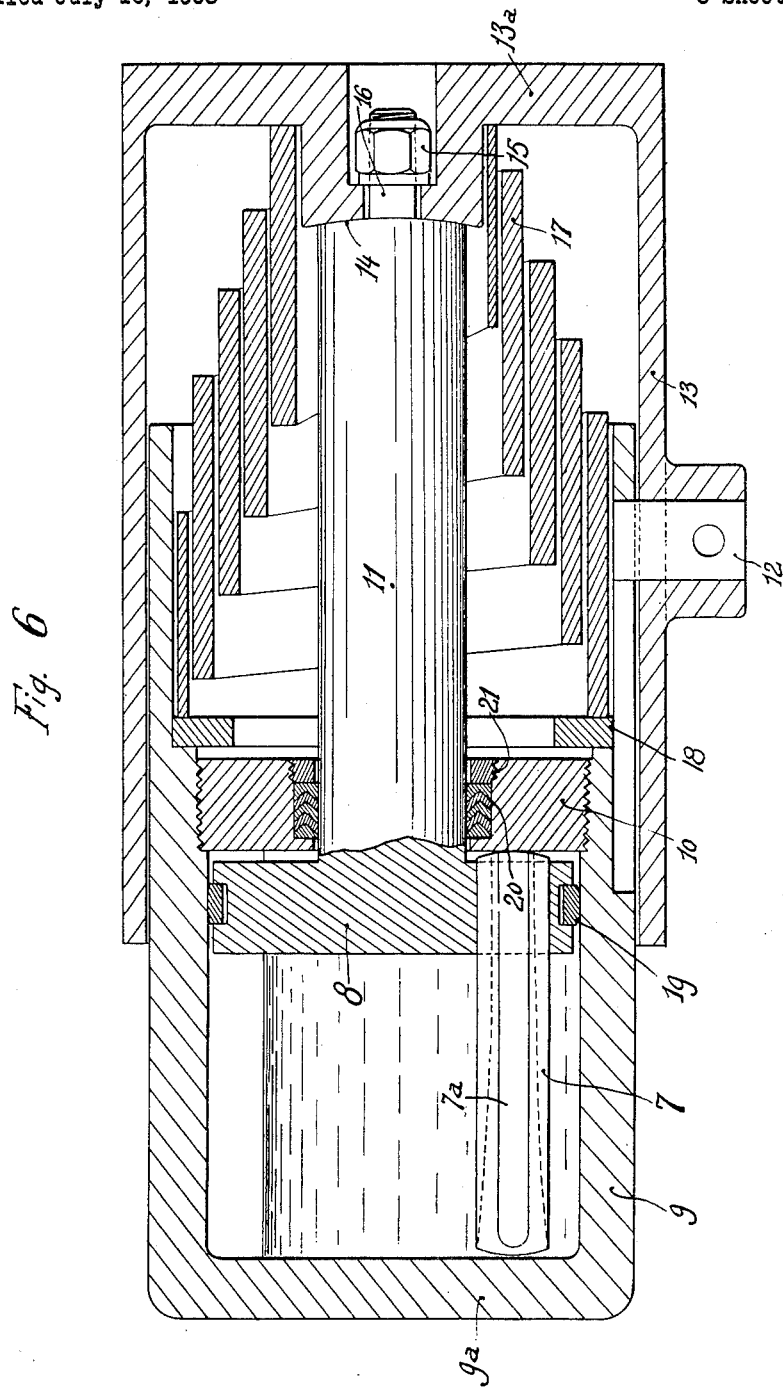

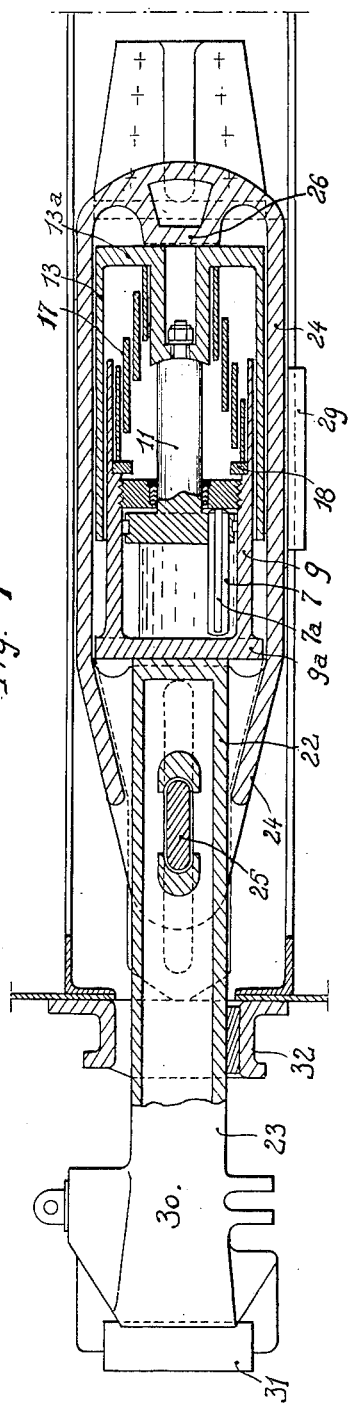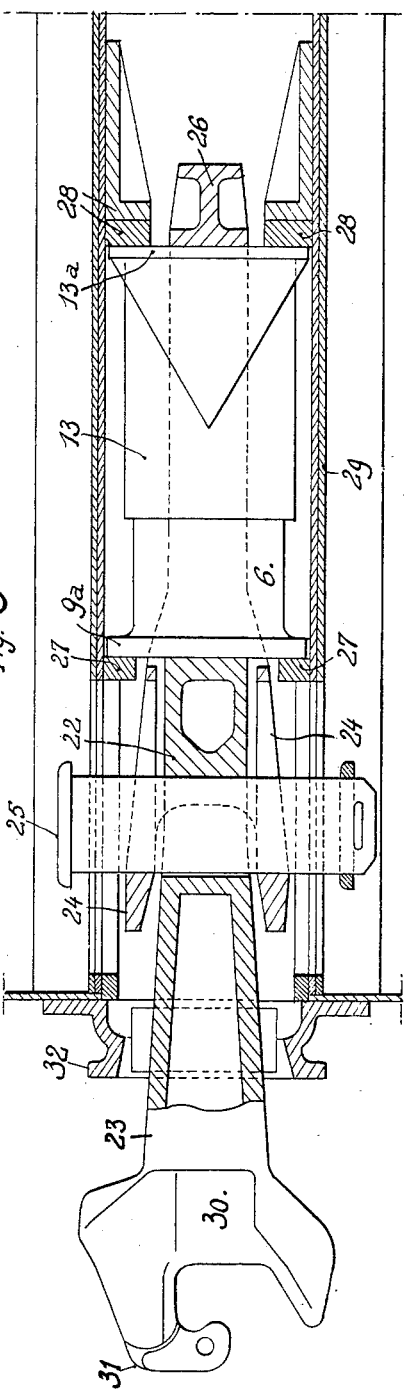

United States Patent Office 3,040,907
Patented June 26, 1962

3,040,907
HYDRAULIC SHOCK-ABSORBER
André Pelabon, Paris, France, assignor to Societe Anonyme dite: Les Ateliers de Construction du Nord de la France, Crespin-Blanc-Misseron, France, a corporation of France
Filed July 16, 1958, Ser. No. 748,839
Claims priority, application France Nov. 7, 1957
6 Claims. (Cl. 213—43)

It is known that the shock-absorbers operating by hydraulic means—with the exception of shock-absorbers of the "viscous type—utilise a throttling action on a liquid compelled to pass through one or more narrow apertures or passages.

In the most simple construtcions, these passages have a constant section, but in this case the flow of the liquid is irregular, and in particular a peak pressure occurs at the beginning of the shock. If the latter is very violent, its effects reverberate largely on the fixed rear portion of the shock-absorber cylinder that is to say on the end towards which the piston is directed.

Other shock-absorbers, likewise known, are provided with tapered bores or variable-section grooves in the cylinder, or with tapered apertures or needles, perforated linings etc. These various passages are selected, in general, in such a manner that, even in the event of very violent shocks, the pressure in the cylinder rises slowly and is finally stabilized, thus reducing the stresses to which the fixed portion is subjected.

The present invention—applicable in particular to buffers of railways rolling stock—relates to hydraulic shock absorbers of this second category.

It is characterised in that the said passages offered to the liquid from one face of the piston to the other are provided not in the cylinder or in the piston or in a fixed diaphragm, but in a body which is said to be "floating" in the sense that it is not rigidly connected to any member of the shock absorber so that it is absolutely free to move in the cylinder. By its very displacement under the effect of the pressure, this floating body regulates the pressure. Moreover, it offers the advantage of permitting, on the one hand the sections of passage of the liquid to be proportioned as a function of the acceptable effect on the fixed portion of the shock absorber, and on the other hand the characteristics of opeartion to be changed by the substitution of another "floating" body for the one which is in service.

Finally, from the point of view of manufacture, the calibration of the passages for the liquid is easily carried out and the assembly of the shock absorber is remarkably simple because it does not comprise any valves.

The invention likewise relates to a shock-absorbing coupling device for railway rolling stock, utilizing the shock absorber according to the invention, particularly for the construction of a railway buffer with a long travel. This device permits the optimum efficiency of said shock-absorber to be obtained as well as its regular operation whatever the direction of application of the forces acting thereon, whether said forces are longitudinal, pulling or pushing, or even if they comprise a large lateral component.

According to this embodiment of the present invention, the shock absorber is incorporated in a plunger-and-casing system, the members of which are adapted to slide, one in relation to the other, and none of which is rigidly connected to the chassis of the vehicle or to a fixed intermediate member, the forces to be damped being transmitted to said system through rods or flanges, associated with the coupling device proper, the particular design and the preferred arrangement of the stuffing-boxes and flexible packings interposed between said shock-absorber and said plunger-and-casing system further permitting a certain angular freedom of the former in relation to the latter and consequently permitting a better damping of the oblique or lateral shocks.

Other features of the invention will appear in the course of the description and on the accompanying drawings which illustrate, by way of non-limiting example, various embodiments of the invention.

FIG. 1 is a view in longitudinal axial section of a hydraulic shock-absorber provided with a floating body.

FIG. 2 illustrates, in longitudinal section, a first embodiment of the floating body.

FIG. 3 is a cross-section thereof along III—III in FIG. 2.

FIG. 4 is a view in elevation of another type of floating body.

FIG. 5 is a cross-section through the above along IV—IV in FIG. 4.

FIG. 6 shows, in longitudinal section, the shock-absorber incorporated in a plunger-and-casing system according to the invention.

FIGS. 7 and 8 illustrate, in two perpendicular longitudinal sections, the application of the device of FIG. 6 to a coupling with a central buffer.

In FIG. 1:

P represents the piston displaced in the cylinder C containing a liquid, for example oil or any composition which is usual in this type of apparatus. This liquid does not fill the cylinder completely, thus retaining a cushion of air which, under the effect of a shock, is compressed in proportion to the advance of the piston in the direction of the arrow $f$, to compensate for the volume of the piston rod progressively entering the cylinder.

In the example of FIGS. 1, 2 and 3, the floating body consists of a hollow rod 1, closed at its two ends and comprising two sets of apertures 2 and 3. This hollow rod which passes right through the piston P, is entirely free axially. The apertures 2 and 3 are situated on each side of the position of rest of the piston.

Depending on the direction of the piston stroke, the hollow rod bears against one cylinder head or the other, for example against the rear head $C^1$ in the compression stroke (direction $f$). At the beginning of this stroke, the liquid can pass from the chamber 4, through all the apertures 2, into the internal passage in the rod 1 and reach the chamber 5 through the apertures 3. Then the apertures 2 closest to the piston are successively covered thereby, or even ultimately pass into the opposite chamber in such a manner that the total section of passage offered to the liquid decreases progressively until the end of the stroke. A similar process takes place during the expansion stroke but in the opposite direction, that is to say the apertures 3 progress towards the apertures 2.

The relative distance of the two sets of apertures in relation to the piston, the distribution of the apertures in each set, and their dimensions, are each factors which permit the variation in pressure to be regulated and which permit a uniform pressure to be obtained during the operation of the shock-absorber.

In the embodiment illustrated in FIGS. 4 and 5, the floating body consists of a solid rod 6 and the apertures are replaced by a set of longitudinal grooves 7, of different lengths, at the periphery of said rod. As in the previous example, the section of passage offered to the liquid diminishes proportionately as the piston penetrates into the cylinder (compression stroke) or moves back (expansion stroke).

According to the present invention, the shock-absorber may be incorporated in a shock-absorbing coupling device for railway rolling stock; this device, which is illustrated in FIG. 6, comprises the shock absorber according to the invention which contains a floating body 7, provided with longitudinal grooves 7a. This body passes freely through the piston 8 which slides in the interior of a cylinder forming a plunger body 9 provided on the one hand with a head forming an impact plate 9a and on the other hand with a cover 10, provided with an aperture affording passage to the rod 11 of the piston 8.

According to the present invention, the plunger body 9 is itself capable of sliding on stops 12 insides a casing 13 of which the end, forming a plate 13a receives in its centre, by means of a swivel joint 14, the end of the rod 11 of the piston 8. A nut 15 screwed on to an extension 16 of the rod 11 holds the latter in position when the expansion takes place, said nut forming a stop on the end of the casing 13.

A volute spring 17, which is coaxial with the piston rod, bears on the one hand against the end of the plunger body, by means of an interposed washer 18 and on the other hand against the inner face of the plate 13a.

The piston 8 is provided at its periphery with a loose ring or packing 19. The sealing between the rod 11 of the piston and the cover 10 is effected by a set of flexible packing rings 20 held by a gland 21. A certain clearance is provided, on the one hand between the bore of the aperture in the cover 10 and the gland 21 and on the other hand between the latter and the rod 11 of the piston.

It should be noted that the grooves 7a forming hydraulic passages are of decreasing section on the side of the impact plate 9a of the plunger and have the maximum section on the side of the cover 10.

The plunger-and-casing system which has just been described constitutes the actual shock-absorbing device of a coupling with two buffers according to the present invention. In FIGS. 7 and 8, this system is applied to a coupling with a central buffer. The coupling members which act directly thereon comprise on the one hand the stem 22 of a coupling body 23 bearing on the plate 9a of the plunger 9, and on the other hand a draw strap 24 enclosing the whole of the plunger-and-casing system and articulated to the stem 22, for example by means of a cotter 25; the loop 26 of said strap bears against the plate 13a forming the end of the casing 13. Stops 27 and 28, rigidly connected to the chassis of the vehicle or to the housing 29 containing the whole of the device, limit the movements of the plunger 9 and of the casing 13 respectively.

The coupling member 23, extended by the stem 22, ends, in a manner known per se, in a draw head 30 comprising an articulated jaw 31 controlled, when at rest, by a jaw-pusher, in turn actuated by a bolt situated inside the head and not illustrated on the drawing. This bolt is actuated by a safety-bar which acts through an unlocking device of any suitable type.

A guide 32 situated at the front of the housing 29 permits a certain play of the stem 22 in response to the oblique or lateral forces.

When a violent shock is exerted on the draw head 30 it is transmitted to the plunger body 9 by means of the stem 22. The plunger begins to penetrate to the interior of the casing 13 which bears against the stops 28 rigidly connected to the chassis or housing 29. The penetration of the plunger into the interior of the casing leads to the relative movement of the piston inside the plunger body. The shock absorb consisting of the piston, the plunger body and the floating body then functions in the manner described. Nevertheless, the sliding of the plunger 9 on the stops 12 and the opposing action of the volute spring 17 combine to increase the damping action of the device as a whole. Moreover, the existence of the peripheral ring 19, of the flexible packing rings 20 and of the swivel joint 14 permits a certain angular freedom of the piston, in relation to the plunger body and the casing, thus permitting a suitable damping of the oblique shocks and of the various lateral forces acting on the whole.

Finally, the interposed washer 18 prevents the plunger 9 from being hammered by the spring 17. The sections of the grooves 7a are carefully calculated to obtain a substantially complete damping of the kinetic energy resulting from the shock of two vehicles colliding at a relative speed which may amount to about 20 k.p.m. for loaded vehicles. The volute spring with a long travel mounted in parallel with the hydraulic system completely absorbs the energy of the shock and effects the return of the plunger to its initial position against the stops 27 rigidly connected to the chassis 29 and hence the return of the coupling to its initial position.

When a more or less violent traction is exerted on the draw head 30, it is transmitted by means of the stem 22 and the draw strap 24 keyed thereto, to the plate 13a forming the end of the casing 13. The latter begins a telescoping movement over the plunger 9 which bears against the stops 27 rigidly connected to the chassis; the penetration of the plunger into the moving casing is accompanied by the attendant movement of the piston inside the plunger. The shock absorber consisting of the plunger, the piston and the floating body then functions in the manner which has been described.

The part played by the volute spring 17, the peripheral ring 19, the flexible packing rings 20 and the swivel joint 14 is the same in the case of pull as in that of thrust.

When the thrust or the pull ceases, the volute spring 17 further acts as a return spring capable of restoring the plunger or the casing to its initial position.

It should be noted that in the embodiment shown in FIGS. 7 and 8, and in any other differing therefrom only in the type of central automatic coupling, the shock absorber incorporated in the plunger-and-casing system constitutes a self-contained and detachable assembly which is a great advantage from the point of view of inspection and maintenance.

I claim:
1. A shock absorber comprising means defining a cylinder, piston means slidable in said cylinder, elastic means supporting said piston means in said cylinder and enabling limited lateral and pivotal movement of said piston means with respect to said cylinder, a liquid partially filling said cylinder and sealed therein, said piston means defining first and second chambers in said cylinder which are normally isolated, said piston means being provided with an aperture, and means in said aperture and free from connection with said piston means and cylinder, the latter means extending in both said chambers and defining a flow area for said liquid between said chambers, said flow area varying between a maximum at the start of a stroke of said piston means and a minimum at the end of the stroke whereby the resistance of said liquid to said displacement is uniform, said elastic means resisting lateral forces on said piston means whereby said piston means is adapted to resist oblique forces applied thereto.

2. A shock absorber comprising means defining a cylinder, a piston slidable in said cylinder, means elastically sealing said piston in said cylinder and enabling limited lateral and pivotal movement thereof with respect to said cylinder, a piston rod coupled to said piston for moving the same, said cylinder being provided with an aperture, said piston rod extending through said aperture and defining a space therewith, elastic means in said space and engaging said piston rod and said first means in sealing relation and enabling said rod to be slidable through said aperture, said elastic means permitting limited lateral and pivotal movement of said rod in said aperture, a liquid partially filling said cylinder and sealed therein, said piston defining first and second chambers in said cylinder which are normally isolated, said piston being provided with an aperture and means in said aperture and free from connection with said piston and cylinder and extending in both said chambers, the latter means defining a flow path for said liquid between said chambers, said flow path being a maximum upon initial displacement of said piston, and diminishing to a minimum with said piston displaced whereby the resistance of said liquid to said displacement is uniform.

3. A hydraulic shock absorber as claimed in claim 2, wherein said movable body consists of a hollow rod closed at its ends and provided with two sets of calibrated apertures.

4. A hydraulic shock absorber adapted to resist oblique shocks, the shock absorber being adapted for use with railway rolling stock and comprising means defining a cylinder, a casing engirdling said cylinder and defining a space therebetween, said cylinder being slidable in said casing and having limited lateral and pivotal movement with respect thereto, a piston in said cylinder, means elastically supporting said piston in said cylinder and permitting sliding of said piston and limited lateral and pivotal movement thereof with respect to said cylinder, a liquid partially filling said cylinder, the piston defining first and second chambers in said cylinder normally isolated from one another, a piston rod, said cylinder being provided with an aperture, said piston rod being in said aperture and connected to said piston, said piston rod having an end remote from said piston, means connecting said end of said piston rod to said casing and permitting swiveling of the piston rod with respect to said casing, means in said aperture and engaging said piston rod and permitting sliding of said rod and limited lateral and pivotal movement of said rod, said piston having an aperture, means in said latter aperture and free from connection with said piston and cylinder and extending in both said chambers, said means providing communication between said chambers, said communication being a maximum upon initial displacement of said piston and decreasing to a minimum upon stopping of said piston, the last said means comprising a rod having opposite ends, the rod having a length less than that of said cylinder and adapted to abut said cylinder with said piston displaced, said rod being curved at said ends whereby said piston and rod are pivotable with respect to said cylinder and said casing with said rod abutting said cylinder upon the application of oblique forces to said casing and cylinder.

5. A shock absorber as claimed in claim 4 comprising a volute spring between said cylinder and said casing for resisting relative displacement therebetween.

6. A shock absorber as claimed in claim 2 wherein said latter means comprises a solid rod having passageways extending longitudinally therealong, said passageways being of different length to permit varying quantities of liquid to pass between said chambers dependent upon the relative position of said piston and said rod.

References Cited in the file of this patent

UNITED STATES PATENTS

| | | |
|---|---|---|
| 782,964 | Hopkinson | Feb. 21, 1905 |
| 999,871 | Rector | Aug. 8, 1911 |
| 1,037,052 | Rennie | Aug. 27, 1912 |
| 1,368,429 | Ruesch et al. | Feb. 15, 1921 |
| 1,484,859 | Aker | Feb. 26, 1924 |
| 1,833,940 | Gibbs | Dec. 1, 1931 |
| 1,956,668 | Charles | May 1, 1934 |
| 2,039,135 | Waugh et al. | Apr. 28, 1936 |
| 2,101,265 | Mercier | Dec. 7, 1937 |
| 2,325,430 | Setz | July 27, 1943 |
| 2,356,563 | Bingham | Aug. 22, 1944 |
| 2,440,353 | Wallace | Apr. 27, 1948 |
| 2,726,773 | Fitz-John | Dec. 13, 1955 |
| 2,852,108 | Ransom | Sept. 16, 1958 |

FOREIGN PATENTS

| | | |
|---|---|---|
| 296,712 | Great Britain | July 18, 1929 |